US008638793B1

(12) United States Patent
Ben-Mayor et al.

(10) Patent No.: US 8,638,793 B1
(45) Date of Patent: Jan. 28, 2014

(54) ENHANCED PARSING AND CLASSIFICATION IN A PACKET PROCESSOR

(75) Inventors: Shaul Ben-Mayor, Modiin (IL); Erez Izenberg, Tel-Aviv (IL)

(73) Assignee: Marvell Israle (M.I.S.L) Ltd., Yokneam (IL)

( * ) Notice: Subject to any disclaimer, the term of this patent is extended or adjusted under 35 U.S.C. 154(b) by 471 days.

(21) Appl. No.: 12/755,234

(22) Filed: Apr. 6, 2010

Related U.S. Application Data (60) Provisional application No. 61/166,928, filed on Apr. 6, 2009.

(51) Int. Cl.
*H04L 12/28* (2006.01)
(52) U.S. Cl.
USPC .............................. 370/392; 370/389; 726/13
(58) Field of Classification Search
None
See application file for complete search history.

(56) References Cited

U.S. PATENT DOCUMENTS

| 6,970,462 | B1* | 11/2005 | McRae | 370/392 |
| 7,042,848 | B2* | 5/2006 | Santiago et al. | 370/253 |
| 7,133,400 | B1* | 11/2006 | Henderson et al. | 370/389 |
| 7,233,597 | B2* | 6/2007 | Kumar et al. | 370/401 |
| 7,289,498 | B2* | 10/2007 | Yu et al. | 370/389 |
| 7,702,899 | B2* | 4/2010 | Kobozev et al. | 713/150 |
| 8,358,655 | B2* | 1/2013 | Wang et al. | 370/392 |
| 2003/0108038 | A1* | 6/2003 | Devanagondi et al. | 370/389 |
| 2005/0044252 | A1* | 2/2005 | Floyd et al. | 709/230 |
| 2009/0092136 | A1* | 4/2009 | Nazareth et al. | 370/392 |

* cited by examiner

*Primary Examiner* — Michael J Moore, Jr.

(57) ABSTRACT

An apparatus includes a comparator engine having a comparison logic unit to compare at least a portion of a header of a data unit to a header pattern, where the header pattern corresponds to at least a portion of a header of a previously analyzed data unit, and a match indication generator to generate a match indication if the at least a portion of the header matches the header pattern; and a result generator to cause the data unit to be processed based on the previously analyzed data unit if the match indication is generated.

18 Claims, 4 Drawing Sheets

ENHANCED PARSING AND CLASSIFICATION IN A PACKET PROCESSOR

CROSS-REFERENCE TO RELATED APPLICATION

This application claims the benefit of U.S. Provisional Patent Application No. 61/166,928, filed on Apr. 6, 2009, entitled "Enhanced Parsing and Classification," the entire disclosure of which is hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, routers, gateways, and other types of communication devices are used in a variety of applications to process multiple streams of data and service multiple connections. To direct data packets in these streams to proper destinations (such as queues or ports), communication devices often apply multiple parsing rules to packet headers. However, parsing operations generally are resource- and time-intensive. As a result, parsing often introduces significant latency to data streams.

SUMMARY

In an embodiment, an apparatus includes a comparator engine having a comparison logic unit to compare at least a portion of a header of a data unit to a header pattern, where the header pattern corresponds to at least a portion of a header of a previously analyzed data unit, and a match indication generator to generate a match indication if the at least a portion of the header matches the header pattern; and a result generator to cause the data unit to be processed based on the previously analyzed data unit if the match indication is generated.

In an embodiment, a method for automatically processing a data unit in a packet processor includes receiving a data unit having a header and a payload, comparing at least a portion of the header to a header pattern associated with a previously analyzed data unit, generating a match indication if the at least a portion of the header matches the header pattern, and causing the data unit to be processed based on the previously analyzed data unit if the match indication is generated.

In an embodiment, a network apparatus includes a packet processor configured to determine whether a currently received header associated with a currently received data unit includes a portion that corresponds to a previously received header associated with a previously received data unit, and a forwarding engine configured to make a forwarding decision for the currently received data unit at least partly based on the previously received header, when a portion of the currently received header corresponds to the previously received header.

DETAILED DESCRIPTION

Example packet processing methods and apparatus are described herein in the context of Ethernet networks. One of ordinary skill in the art will recognize, in light of the disclosure and teachings herein, that similar methods and apparatus are suitable for use in other communication networks as well.

Figure 1:
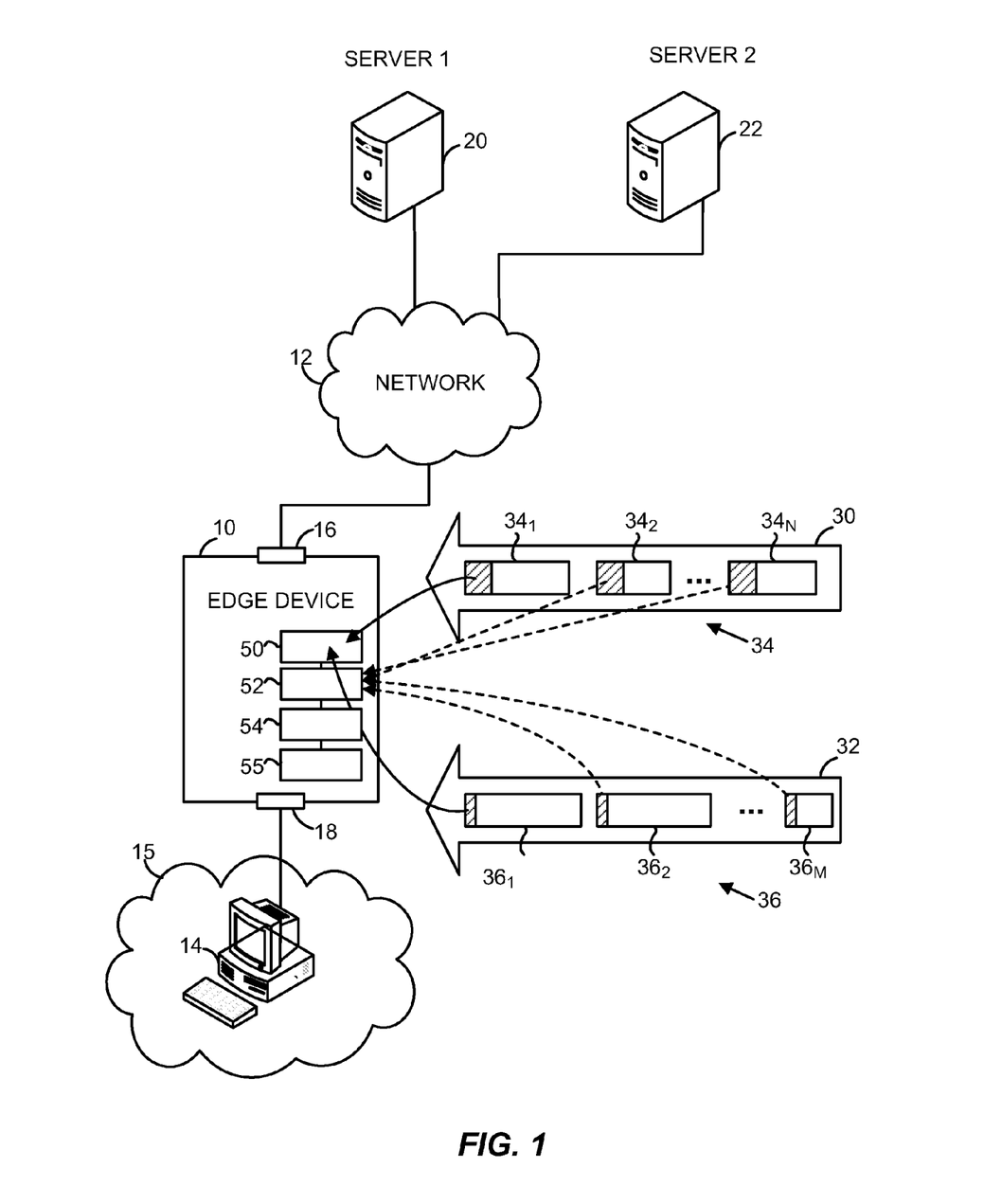
FIG. 1 is a block diagram of an example communication system in which a packet processor with an accelerated parsing engine is utilized in accordance with an embodiment of the present disclosure.

FIG. 1 is a block diagram of a network device 10, configured to efficiently process data streams that include multiple data units (or "data packets"), in an example arrangement between a network 12 and a host 14 operating in a network 15, according to an embodiment of the present disclosure. Depending on the embodiment, the network device 10 is an edge device, a switch, a gateway, etc., or a component thereof. The network device 10 includes a first network interface 16 with one or several network ports to communicate with the network 12, and a second network interface 18 with one or several network ports to communicate with the host 14. In the example configuration illustrated in FIG. 1, the network device 10 concurrently supports a first network connection (e.g., a network port on the interface 16 and a network port on the interface 18) between the host 14 and a server 20 across which the server 20 transmits a data stream 30, and a second network connection between the host 14 and a server 22 across which the server 22 transmits a data stream 32. Each of the data streams 30 and 32 includes a respective sequence of data units 34 and 36.

In the embodiment illustrated in FIG. 1, data units included in the sequence 34 or 36 have a header portion and a payload portion (illustrated in FIG. 1 as shaded and un-shaded regions, respectively). As used herein, the term "data unit" refers to a data packet or frame of any size and associated with any level of the protocol stack supported by the network device 10.

In operation, the network device 10 makes forwarding decisions that result in data units received from the network 12 being forwarded to a network port that communicates with one or several hosts (e.g., the host 14) on the network 15. In some scenarios, the network device 10 also makes forwarding decisions that result in data units received from the network 15 being forwarded to a network port that communicates with one or several hosts on the network 12. To this end, the network device 10 includes a packet processing engine 50 to parse and classify data units, a comparator engine 52 to compare a portion of a data unit to one or several data patterns associated with previously analyzed one or several data units to determine whether previous parsing and classification results are applicable to the data unit, and a memory 54 coupled to the packet processing engine 50 and the comparator engine 52 to store data patterns as well as parsing and classification results. In some embodiments, the memory 54 is provided as a component of a circuit (e.g., a card) that also includes the elements 50 and 52. In other embodiments, the memory 54 is a separate component that interacts with the elements 50 and 52 via a digital bus, for example. Further, in an embodiment, the network device 10 includes a forwarding engine 55 to forward data units in accordance with forwarding decisions generated by the packet processing engine 50 and/or the comparator engine 52.

In an embodiment, to allow the network device 10 to efficiently process data streams such as the data stream 30, the packet processing engine 50 parses the header portion of first data unit $34_1$ and classifies the data unit $34_1$ using the parsing results to determine the destination for the data unit $34_1$. Additionally, the packet processing engine 50 identifies a data pattern that the data units $34_2$-$34_N$ in the sequence 34 share with the data unit $34_1$, and stores the identified data pattern in the memory 54. The data pattern in one example scenario corresponds to a certain portion of the Internet Protocol (IP) header according to an embodiment. The packet processing engine 50 also stores the parsing and classification results associated with the data unit $34_1$ in the memory 54. When the data unit $34_2$ arrives at the network device 10, the comparator engine 52 compares the header portion of the data unit $34_2$ to one or several data patterns stored in the memory 54 and, upon recognizing that the header portion of the data unit $34_2$ includes the data pattern detected in the data unit $34_1$, uses the stored parsing and/or classification results associated with the data unit $34_1$ to further process the data unit $34_2$ (e.g., forward the data unit $34_2$ to a target port via a corresponding queue, drop the data unit $34_2$ if the data pattern indicates a malicious data stream). The comparator engine 52 similarly processes each remaining data unit in the sequence 34.

In other words, the network device 10 uses the stored data pattern (identified in the data unit $34_1$) to determine that the data units $34_2$-$34_N$ belong to the same data stream 30 as the data unit $34_1$. According to an embodiment, the network device 10 thus efficiently processes (e.g., routes) the data stream 30 without requiring that the packet processing engine 50 analyze (e.g., parse and classify) every data unit in the sequence 34. In the example configuration depicted in FIG. 1, the network device 10 similarly processes the sequence 36 in the data stream 32. In general, the network device 10 can apply this technique to any number of concurrent data streams, i.e., data streams set up between the host 14 and the network 12 that are active at the same time.

In some embodiments, the packet processing engine 50 parses several (e.g., the first three) data units in each data stream before the comparator engine 52 reliably identifies a data pattern common to all data units in a particular data stream. In one such embodiment, the packet processing engine 50 or another module applies a statistical metric (e.g., a percentage of the total traffic) to determine whether a certain data pattern can and should be used for parsing and classifying the data stream. The number of data units in a data stream that are fully parsed prior to processing data units using the comparator engine 52 is dependent on one or more of the type of the data stream, configuration options of the network device 10, the results generated by the packet processing engine 50, etc., according to various embodiments.

In some situations, the data pattern used to determine whether a data unit belongs to a data stream in which at least one data unit has already been processed is an uninterrupted block in the header portion of the data unit. In other situations, the data pattern includes several non-contiguous blocks in the header portion. Further, depending on the configuration of the network device 10 and/or the type of stream being processed, the header portion spans one or several communication layers, and includes one or several headers of the protocols used at the respective communication layers. For example, in the embodiment illustrated in FIG. 1, the data pattern of the data units $34_1$-$34_N$ and $36_1$-$36_N$ is only in the IP header, although in another embodiment, the data pattern is in both the IP header and the Transmission Control Protocol (TCP) header.

In the example of the system depicted in FIG. 1, the network device 10 operates in a Digital Subscriber Line (DSL) router that connects a residential network to a wide area network (WAN) using the Point-to-Point over Ethernet (PPoE) network protocol. In a typical scenario, the network device 10 processes relatively few data streams at the same time. The server 20, in one embodiment, is a provider of video content that transmits the data stream 30 to the host 14 via a TCP connection; and the server 22, in one embodiment, is a source of a large file such as a high-resolution picture, for example, transmitted in the data stream 32 via another TCP connection. In an embodiment, each stream 30, 32 is layered over PPoE. It is noted that, in an embodiment, once set up, the data streams 30 and 32 are used for a relatively long period of time; and thus the network device 10 saves a significant amount of processing time and resources, and therefore reduces latency by applying the results of parsing and/or classifying one or several data units in the data streams 30 and 32 to the other data units in these data streams.

Figure 2:
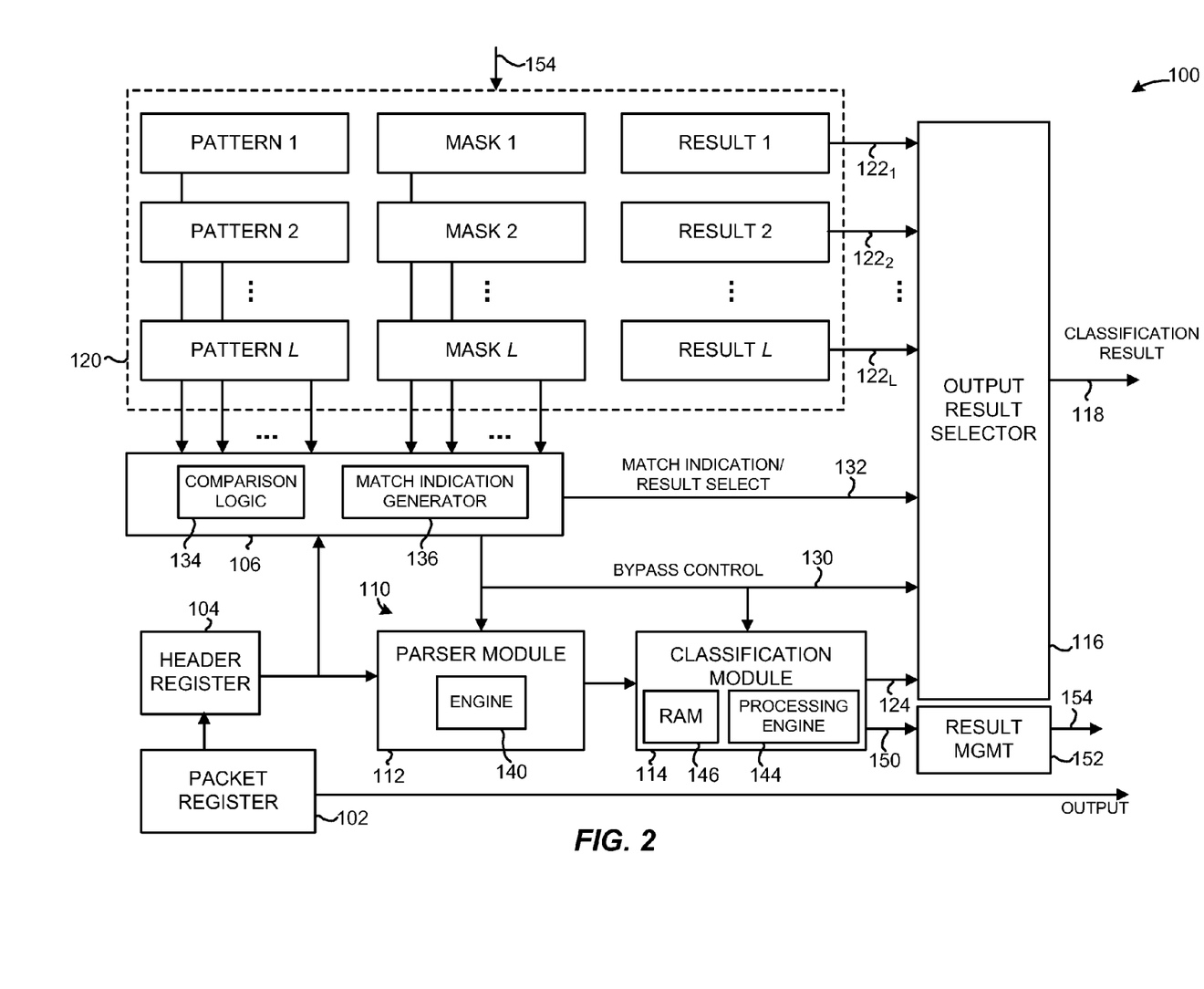
FIG. 2 is a block diagram of an example accelerated parsing engine in accordance with an embodiment of the present disclosure.

Referring to FIG. 2, a packet processor 100 is used as the network device 10 depicted in FIG. 1, in accordance with an embodiment of the present disclosure. The packet processor 100 includes a packet register 102 to store a data unit (or a data unit descriptor) during processing. The packet register 102 in an embodiment is a memory buffer maintained in a random access memory (RAM) unit (not shown) included in, or communicatively coupled to the packet processor 100. In some embodiments, the packet processor 100 generates a relatively small data unit descriptor that includes such information as the address of the data unit in the memory buffer and the length of the data unit, for example, and propagates the data unit descriptor through various components of the packet processor 100 to avoid time- and resource-intensive propagation of the entire data unit. In some of these embodiments, the packet register 102 stores only the data unit descriptor.

The header of the data unit stored in the packet register 102 is stored in a header register 104. Similar to the packet register 102, the header register 104 in one embodiment is implemented in a RAM unit. In another embodiment, the header register 104 is a dedicated hardware register. In yet another embodiment, the header register 104 is only a logical designation within the packet register 102 (e.g., a mapping) so that the packet processor 100 need not copy the header of a data unit to a separate memory location. The header generally can be associated with any one or several layers of the protocol stack. Thus, the header can be a PPoE header, an IP header, a TCP header, an IP header together with a TCP header, a layer 2 header including a media access channel destination address (MAC-DA) and/or a source address (MAC-SA), a layer 2 header including a virtual local area network (VLAN) tag, etc.

Information from one or several previously analyzed headers (e.g., data patterns), related information (e.g., masks associated with respective data patterns), and data generated as a result of analyzing headers (e.g., classification results corresponding to the stored patterns), are stored in a memory such as RAM, for example, and referred to hereinafter "classification data 120" for simplicity. In the embodiment illustrated in FIG. 2, the header is loaded into the header register 104 and subsequently supplied to both a comparator engine 106 and a parsing/classification engine (or pipeline) 110 that includes a parser module 112 and a classification module 114. The comparator engine 106 and the parsing/classification pipeline 110 proceed to process the header in parallel. In particular, the comparator engine 106 processes the header using the classification data 120 in the event of match between the header and one or several data patterns included in the classification data 120, and the parsing/classification pipeline 110 processes the header using one or several sets of rules stored in the same memory unit or another location. In an embodiment, each of the comparator engine 106 and the parsing/classification pipeline 110 accesses the same or respective memory unit via any suitable memory interface. Both the comparator engine 106 and the parsing/classification pipeline 110 are coupled to a result generator such as an output selector 116 via result lines $122_1$-$122_L$ and 124, respectively. As discussed in more detail below, the comparator engine 106 specifies which of the result lines $122_1$-$122_L$ should be selected at the output results selector 116 via a bypass control line 130 and a result selection line 132. The output results selector 116 provides the selected output at a channel 118 for subsequent processing (e.g., forwarding to a particular host and/or port on the host, storing in a queue, deleting).

In an embodiment, the comparator engine 106 includes a comparison logic module 134 that compares the currently received header (or another portion or several portions of the data unit) to one or several patterns included in the classification data 120 and associated with previously received headers, and a match indication generator 136 that generates a match indication such as a signal on the bypass control line 130 to indicate that a match has been found and/or a signal on the match indication/result selection line 132 that specifies which of the several results in the classification data 120 corresponds to the match between the currently received header and one of the data patterns in the classification data 120.

As illustrated in FIG. 2, in an embodiment, the bypass control line is also coupled to the parsing/classification pipeline 110 (e.g., to each of the parses module 112 and the classification module 114). The comparator engine 106 determines whether any of the results in the classification data 120 can be applied to the data unit currently being processed (e.g., the data unit stored in the packet register 102). Because the comparator engine 106 makes this determination significantly faster than the parsing/classification pipeline 110 can process the header, the comparator engine 106 in an embodiment instructs the parsing/classification pipeline 110 to abort processing the header via the bypass control line 130 upon determining, based on comparing the header to previously parsed headers associated with the classification data 120, that the classification data 120 includes results applicable to the data unit. Conversely, if the comparator engine 106 determines that the data unit cannot be processed using the classification data 120, the comparator engine 106 does not generate an abort signal on the bypass control line 130, and the parsing/classification pipeline 110 accordingly is allowed to complete parsing and/or classification operations.

In the embodiment illustrated in FIG. 2, the classification data 120 includes L sets of parsing/classification results, each set including a pattern, a mask, and a result descriptor. In an example configuration, the pattern associated with a first data stream corresponds to the 2-byte session identity in the PPoE header, and the mask accordingly selects bytes 2 and 3 of the PPoE header (by specifying the offset from the beginning of the PPoE header, for example), while the pattern associated with a second data stream corresponds to the entire PPoE header, and the corresponding mask selects the entire PPoE header. In accordance with another configuration, a pattern uniquely associated with a certain TCP data stream (in a manner that allows the packet processor 100 to unambiguously identify IP packets that belong to the data stream), includes the source address in the IP header, the destination address in the IP header, and the destination port in the TCP header. The mask identifies these fields relative to the beginning of the IP header, for example, and selects bytes 12-19 in the IP header and bytes 2-3 in the TCP header.

According to yet another configuration, the classification data 120 does not include a mask for any of the L sets of parsing/classification results, and the comparator engine 106 applies the pattern to a certain predetermined (e.g., preconfigured or user-defined) portion of a data unit. For example, the comparator engine 106 compares the entire PPoE header to each pattern in the classification data 120.

In some embodiments, the result descriptor in each set specifies a decision (e.g., forward the data unit or drop the data unit) and a destination (e.g., an egress queue or an egress port). In other embodiments, the result descriptor includes additional information such as a priority setting, for example. Upon determining that the header supplied from the header register 104 matches one of the patterns in accordance with the associated mask, when applicable, the comparator engine 106 causes the output result selector 116 to select the result descriptor among the results 1, ... L in the classification data 120 that corresponds to the matched pattern by identifying the matched pattern via the result selection line 132. In an embodiment, the comparator engine 106 also activates the bypass control line 130 to indicate that one of the results in the classification data 120 is applicable to the data unit currently being processed. In an embodiment, in response to detecting a signal on the bypass control line 130, the output selector 116 uses a signal supplied via the result selection line 132 to select the result to be provided as output on the channel 118. Otherwise, if the output selector 116 does not detect a signal on the bypass control line 130, the output selector 116 provides the data provided via the result line 124 as output on the channel 118.

With continued reference to FIG. 2, each of the result descriptors in the classification data 120, in an embodiment, is stored in a location directly coupled to the output selector 116 via a respective one of the result lines $122_1$-$122_L$. Further, each of the patterns and masks is coupled to the comparator 106 via a dedicated memory interface line, so that the comparator 106 executes each of the L comparisons in parallel. In one such embodiment, the comparator 106, the output result selector 116, and the result lines $122_1$-$122_L$ are implemented in hardware (e.g., a CAM into which the patterns and masks are loaded in conjunction with an SRAM device). If fewer than L sets are currently associated with the classification data 120, the unused pattern, mask, and result memory slots can be populated with certain known values to avoid false pattern detections at the comparator engine 106.

In another embodiment, the classification data 120 is stored in a Terniary CAM (TCAM) module. In yet another embodiment, the classification data 120 is stored in a linked list implemented in RAM, with each element of the link list including a corresponding pattern/mask/result descriptor tuple. The comparator engine 106 in this embodiment is a software routine executed by a processor that traverses the linked list and, for each element of the linked list, applies the mask to the header and compares the masked header to the pattern. Further, in this embodiment, the selection of one of the results included in the classification data 120 is provided with a common line rather than via dedicated result lines $122_1$-$122_L$.

As indicated above, the parsing/classification pipeline 110 begins to analyze the header generally at the same time as the comparator engine 106 according to an embodiment. The parser module 112 and the classification module 114 in the embodiment of FIG. 2 define respective pipeline stages of a processing pipeline. The parser module 112 includes a search engine 140 to search for fields within the header. In an embodiment, the search engine 140 includes a Content Addressable Memory (CAM) such as TCAM, for example. The classification module 114 then uses the parsing results generated by the parser module 112 to identify a flow or data stream to which the data unit belongs. In an embodiment, the classification module includes a processing engine 144 that identifies a destination of the data unit, such as a queue or a network port, for example, based on the generated parsing results and a mapping of parsing results to destinations stored in a RAM module 146. The identified queue or port in some embodiments is associated with a particular priority of class of service (CoS). In an embodiment, the RAM module 146 is implemented as Static RAM (SRAM) to reduce power consumption and improve access speed.

Unless interrupted by a signal on the bypass control line 130, the parsing/classification pipeline 110 completes parsing and classification and supplies the result to the output selector 116 via the result line 124. In some cases, the output of the parsing/classification pipeline 110 is also used to augment the parsing and/or classification data 120. In the embodiment depicted in FIG. 2, the parsing/classification pipeline 110 supplies at least some of pattern, mask, and result information to the memory storing the classification data 120 via a channel 150 and a result management module 152. Otherwise, when a bypass signal on the bypass control line 130 interrupts the parsing/classification pipeline 110 (e.g., to indicate that a classification result is to be selected from among the result lines $122_1$-$122_L$), the parser module 112 retrieves a new header from the header register 104. In an embodiment, the new header is retrieved from the header register 104 immediately upon detecting the bypass signal. In this manner, the bypass control line 130 ensures that the parsing/classification pipeline 110 does not delay the operation of the packet processor 100 by executing superfluous procedures.

In an embodiment, the result management module 152 determines whether a new classification result generated by the parsing/classification pipeline 110 for the data unit currently being processed should be added to the classification data 120 so that subsequent data units sharing the header (or one or several portions of the header) with the data unit can be processed more efficiently. To this end, the result management module 152 in one embodiment determines the type of a data stream to which the data unit belongs (e.g., streaming video, a download session, an email connection). The result management module 152 in an embodiment also checks the number of results in the classification data 120 to determine whether a certain predetermined limit (e.g., L) is reached. Further, the result management module 152 applies logical rules and/or statistical metrics to determine whether the classification data 120 should be augmented with the new classification result in accordance with an embodiment. For example, a rule can specify that a data stream must account for at least 10% of all traffic going through the packet processor 100 to warrant addition of the pattern associated with the data stream to the classification data 120. Still further, in an embodiment, the result management module 152 "ages out" sets associated with torn-down or otherwise completed data streams from the classification data 120 to provide room for new sets. In some embodiments, the result management module 152 updates the classification data 120 in accordance with user-configured parameters. In an embodiment, the result management module 152 provides data and/or comments to the memory storing the classification data 120 via a control line 154.

In some embodiments, the parsing/classification pipeline 110 additionally processes at least a portion of the payload of the data unit in addition to the header. A certain rule for detecting network intrusion, for example, can require inspection of the payload of a data unit. In some scenarios involving rules that extend to payloads, the comparator engine 106 can nevertheless compare only the header of the data unit to the stored parsing/classification results to determine whether the data unit requires complete parsing and classification. In other scenarios involving rules that extend to payloads, the comparator 106 processes both the header of the data unit and the payload of the data unit.

With continued reference to FIG. 2, the selector 116 in an embodiment is a two-tier multiplexer that selects, in the first instance, either the L inputs $122_1$-$122_L$ or the input 124 based on the signal provided on the bypass control line 130 and, in the second instance, one of the L inputs $122_1$-$122_L$ according to the selection signal provided on the line 132, if the signal provided on the line 130 indicates that the inputs $122_1$-$122_L$ should be selected.

Figure 3:
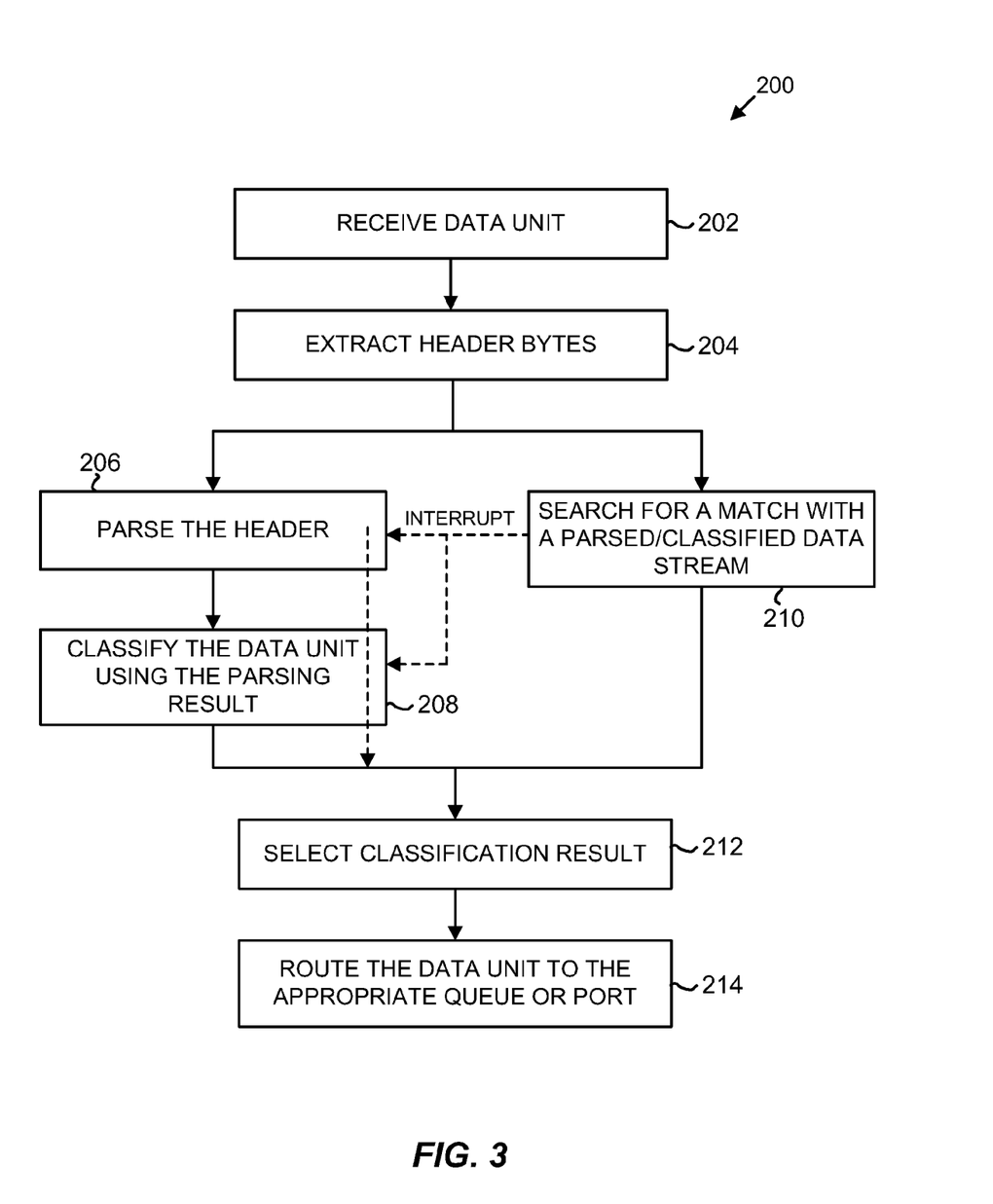
FIG. 3 is a flow diagram of an example method for processing data packets in one or several data streams in accordance with an embodiment of the present disclosure.

Next, FIG. 3 illustrates a flow diagram of an example method 200 for processing data packets in one or several data streams in accordance with an embodiment of the disclosure. The method 200 can be implemented by at least some of the components of the network device 10 or the packet processor 100, for example. At block 202, a data unit such as a data packet is received, and the header of the data unit is extracted at block 204. As discussed above, the header can be defined at any layer of a protocol stack or, in some configurations, the header can span multiple layers (e.g., IP and TCP). Next, the header is parsed at block 206 by searching for one or several patterns, for example. In some embodiments, parsing includes application of rules, possibly including nested rules (e.g., "search for pattern X if pattern Y is located in the PPoE header"). Depending on the embodiment, parsing can be implemented in hardware, a processor executing software instructions, a processor executing firmware instructions, or any combination thereof. The parsing results are then used to classify the data unit and, accordingly, the data stream to which the data unit belongs at block 208.

Block 210 is executed in parallel with the block 206 and, in some cases, the block 208. The packet processor that implements the method 200 determines whether the entire header, a portion of the header, or several non-contiguous portions of the header match one or more patterns associated with previously parsed and classified data units. In some embodiments, particularly those that utilize hardware components such as Application Specification Integrated Circuits (ASICs) or Field Programmable Field Gate Arrays (FPGAs), the header is compared to multiple stored patterns in parallel. In other embodiments, such as those that rely on software components, the header is sequentially compared to several stored patterns. Further, in some embodiments, comparisons between the header and one or more stored patterns are executed using respective masks.

If a match is found at block 210, the execution of the blocks 206-208 is interrupted. Otherwise, if no match is found, the operations associated with the blocks 206 and 208 proceed to completion.

At block 212, a classification result is selected based on the results generated by the blocks 206 and 208, in the absence of an interrupt, or the block 210, based on whether the interrupt was generated at block 210. Finally, at block 214, the data unit is processed according to the selected classification result. For example, the classification result in an embodiment indicates to what queue or port the data unit is to be routed.

Referring back to the previous drawings, the blocks 206 and 208 can be implemented by the packet processing engine 50 or the parsing/classification pipeline 110, for example. It is noted that if a pipeline architecture is used, the blocks 206 and 208 in some cases execute at the same time but operate on different headers. Further, the block 210 can be implemented by the comparator engine 52 or 106, and the block 212 can be implemented by the output selection module 116.

Figure 4:
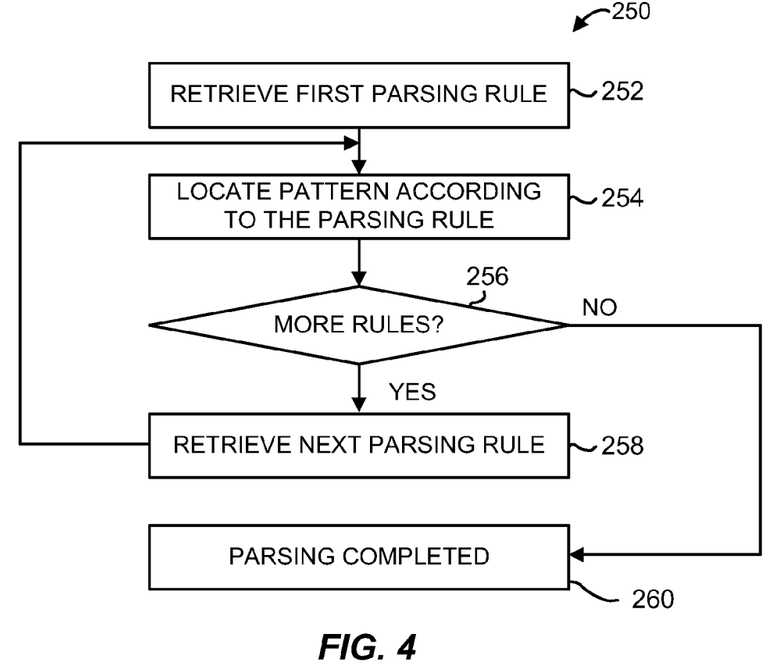
FIG. 4 is a flow diagram of an example method for parsing a data packet in accordance with one or several parsing rules in an embodiment of the present disclosure.

FIG. 4 illustrates an example method 250 for parsing a header of a data unit that the search engine 140 implements in an embodiment of the present disclosure. It is noted that in some scenarios, some or none of the blocks of the method 250 proceed to completion if it is determined that previous results of parsing and classifying data units can be applied to the data unit. At block 252, a first parsing rule is retrieved. Parsing rules, including the first retrieved parsing rules, are then iteratively applied at block 254 and retrieved at block 258 if additional rules are detected at block 256. If no further rules are detected, parsing is completed at block 260.

Figure 5:
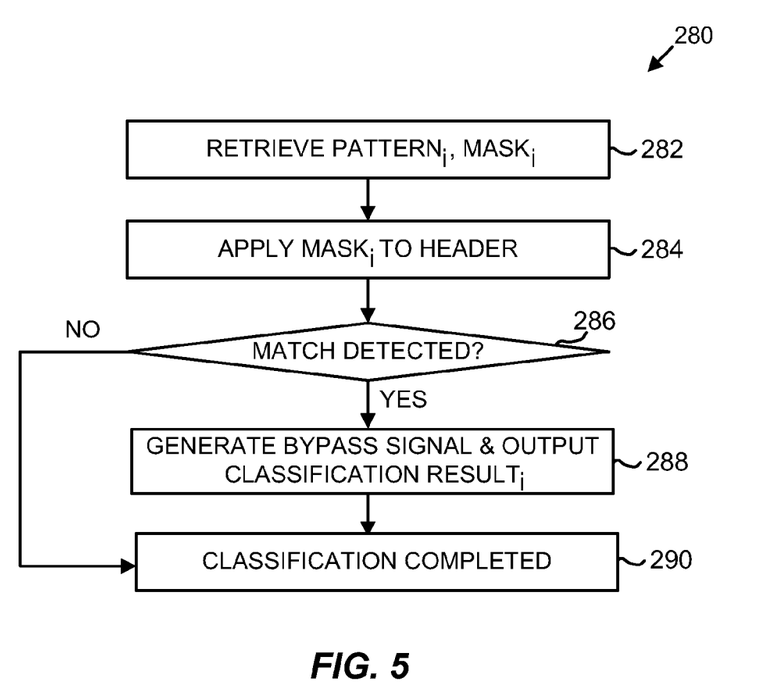
FIG. 5 is a flow diagram of an example method for identifying a data stream to which a data packet belongs based on a previously processed data packet that belongs to the same data stream.

Referring to FIG. 5, an example method 280 for identifying a data stream to which a data unit belongs, based on a comparison to at least one previously processed data unit that belongs to the same data stream, is implemented by the comparator engine 52 and/or the comparator engine 106 in an embodiment. In an embodiment, the method 280 is executed when the search for match block 210 discussed above is invoked. At block 282, a pattern$_f$ and, in some embodiments, the corresponding mask$_f$ are retrieved. The mask$_f$ is applied to the header of the data unit at block 284, and the result is compared to the pattern$_f$ at block 286. In some embodiments, multiple instances of the blocks 282 and 284 are executed in parallel to simultaneously compare the header to multiple patterns, each associated with a respective data stream, by comparing a portion of the received header to multiple lines in a TCAM, for example. In other embodiments the header is iteratively compared to a list of patterns until a match is found or the list is exhausted. If a match between the header (or the appropriately masked header) and one of the patterns is detected, the classification result$_f$ is output at block 288. The 280 then completes at block 290. Otherwise, if no match between the header and any of the patterns is detected, the execution proceeds from the block 286 directly to the block 290.

From the foregoing, it is noted that the techniques described above allow a packet processor to handle higher data rates and reduce latency (by quickly classifying packets based only a header pattern that is repeated among data units in a stream or flow) and conserve power (e.g., by bypassing time-consuming and resource-consuming parsing and classification procedures). Further, these techniques are particularly suitable for home (residential) networks in which a user often establishes a PPoE connection with a server and maintains the connection for a relatively long period of time.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any suitable non-transitory computer readable medium such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. An apparatus comprising:
a packet processing engine configured to (i) parse headers of received data units, and (ii) analyze parsed headers of received data units to classify the received data units;
a comparator engine to process received data units in parallel with the packet processing engine, the comparator engine including
a comparison logic unit to compare at least a portion of a currently received header of a currently received data unit to one or more header patterns without first parsing the at least a portion of the currently received header, wherein the one or more header patterns correspond to at least one or more portions of one or more previously analyzed headers of one or more previously analyzed data units, and
a match indication generator to generate a match indication if the at least a portion of the currently received header matches at least one of the one or more header patterns; and
a result generator to cause the currently received data unit to be processed based on the previously analyzed data unit if the match indication is generated;
wherein the packet processing engine is configured not to further process the currently received data unit in response to the match indication indicating a match between the at least a portion of the currently received header and the at least one of the one or more header patterns.

2. The apparatus of claim 1, wherein the match indication generator is further configured to identify a classification result associated with classification of the previously analyzed data unit, so that the currently received data unit is processed according to the classification result when the match indication is generated.

3. The apparatus of claim 2, further comprising a memory unit that stores a plurality of header patterns and a plurality of classification results, wherein the memory unit associates each of the plurality of classification results with a respective one of the plurality of header patterns; wherein the comparison logic unit is further configured to:
compare in parallel the at least a portion of the currently received header to each of the plurality of header patterns,
wherein the match indication generator is configured to generate the match indication to specify which of the plurality of header patterns matches the at least a portion of the currently received header.

4. The apparatus of claim 1, wherein the comparator engine is further configured to apply a mask associated with the one or more header patterns to the currently received header to generate the at least a portion of the currently received header.

5. The apparatus of claim 1, wherein the packet processing engine comprises:
    a parser module including
        a first memory to store a plurality of fields, and
        a search engine configured to search for the plurality of fields in the currently received header of the currently received data unit to generate a parsing result; and
    a classification module including a processing engine to generate the classification result based on the parsing result.

6. The apparatus of claim 1, wherein the packet processing engine further comprises a result management module configured, if no match indication is generated, to:
    generate a new header pattern based on the currently received header;
    associate a new classification result with the generated classification result; and
    cause the new header pattern and the new classification result to be saved in a memory, so that the comparator engine compares at least a portion of a subsequent header associated with a subsequent data unit to the new header pattern and the new classification result.

7. The apparatus of claim 1, wherein the classification result is a first classification result,
    wherein the match indication generator is further configured to generate a second classification result associated with classification of the previously analyzed data unit, and
    wherein the result generator includes an output selector coupled to the comparator engine and to the packet processing engine to select one of the first classification result and the second classification result based on whether the match indication is generated.

8. A method for automatically processing a data unit in a packet processor, the method comprising:
    receiving a first data unit having a first header and a first payload;
    processing the first header of the first data unit by (i) parsing the first header, and (ii) analyzing the parsed first header to classify the first data unit;
    processing the first header in parallel with (i) parsing the first header, and (ii) analyzing the parsed first header by:
        comparing at least a portion of the first header of the first data unit to a header pattern associated with a previously analyzed second data unit without first parsing the at least a portion of the first header of the first data unit, and
        generating a match indication if the at least a portion of the first header matches the header pattern;
    causing the first data unit to be processed based on the previously analyzed second data unit if the match indication is generated; and
    if the match indication is generated, stopping processing of the first header of the first data unit by (i) parsing the first header, and (ii) analyzing the parsed first header.

9. The method of claim 8, wherein causing the first data unit to be processed based on the previously analyzed second data unit includes
    identifying a classification result, wherein the classification result is generated in response to parsing and classifying the previously analyzed second data unit, and
    applying the classification result to the first data unit.

10. The method of claim 8, wherein processing the first header of the first data unit by (i) parsing the first header, and (ii) analyzing the parsed first header includes
    generating a classification result when no match indication is generated,
    causing the first data unit to be processed according to the classification result when no match indication is generated, and
    not generating the classification result when the match indication is generated.

11. The method of claim 10, wherein processing the first header of the first data unit by (i) parsing the first header, and (ii) analyzing the parsed first header further includes
    causing the classification result to be saved in a memory to define a new classification result if no match indication is generated, and
    causing at least a portion of the first header to be stored in the memory to define a new header pattern;
    wherein the method further comprises:
        receiving a subsequent third data unit having a second header and a second payload;
        comparing at least a portion of the second header of the subsequent third data unit to the new header pattern; and
        causing the subsequent third data unit to be processed according to the new classification result when the second header of the subsequent third data unit includes the new data pattern.

12. The method of claim 8, wherein comparing the at least a portion of the first header to the header pattern includes applying a mask associated with the header pattern to the first header to generate the at least a portion of the first header.

13. A network apparatus comprising:
    a packet processor including
        a packet processing engine configured to process a currently received header associated with a currently received data unit based on at least one parsing rule, and to generate a first classification result;
        a comparator engine configured to process the currently received data unit in parallel with the packet processing engine to
            determine, without first parsing a portion of the currently received header associated with the currently received data unit, whether the portion of the currently received header associated with the currently received data unit includes a portion that corresponds to a previously received header associated with a previously received data unit,
            generate a second classification result when the portion of the currently received header is determined to correspond to the previously received header, and
            generate a bypass signal when the portion of the currently received header is determined to correspond to the previously received header; and
        a forwarding engine configured to make a forwarding decision for the currently received data unit at least partly based on the previously received header, when the portion of the currently received header is determined, without first parsing the portion of the currently received header, to correspond to the previously received header;
    wherein the packet processing engine is configured to not further process the currently received header when the bypass signal is generated.

14. The network apparatus of claim 13, wherein the packet processor further includes:
    an output selector to select the first classification result when the first classification result is available, and to select the second classification result when the first classification is not available.

15. The apparatus of claim 1, wherein the comparator engine is configured to classify the currently received data according to a classification of a first previously analyzed data unit when the currently received header matches a header pattern corresponding to the first previously analyzed data unit.

16. The apparatus of claim 1, wherein the packet processing engine configured to classify the currently received data unit based on (i) parsing of the headers of the received data unit, and (ii) an analysis of the parsed header of the received data unit when the match indication generator does not generate a match indication for the currently received data unit.

17. The apparatus of claim 13, wherein the comparator engine is configured to classify the currently received data according to a classification of the previously received data unit when the portion of the currently received header is determined to correspond to the previously received header.

18. The apparatus of claim 13, wherein the packet processing engine is configured to classify the currently received data unit at least by (i) parsing the header of the received data unit, and (ii) analyzing the parsed header of the received data unit when the bypass signal is not generated.

\* \* \* \* \*